United States Patent
Chen et al.

(10) Patent No.: US 10,901,621 B2
(45) Date of Patent: Jan. 26, 2021

(54) DUAL-LEVEL STORAGE DEVICE RESERVATION

(71) Applicant: Red Hat, Inc., Raleigh, NC (US)

(72) Inventors: Huamin Chen, Westford, MA (US); Eric S. Paris, Raleigh, NC (US); Derek W. Carr, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 217 days.

(21) Appl. No.: 15/840,561

(22) Filed: Dec. 13, 2017

(65) Prior Publication Data

US 2019/0179530 A1    Jun. 13, 2019

(51) Int. Cl.
*G06F 3/06* (2006.01)

(52) U.S. Cl.
CPC .............. *G06F 3/061* (2013.01); *G06F 3/067* (2013.01); *G06F 3/0635* (2013.01)

(58) Field of Classification Search
CPC ......... G06F 3/061; G06F 3/0635; G06F 3/067
See application file for complete search history.

(56) References Cited

U.S. PATENT DOCUMENTS

| | | | |
|---|---|---|---|
| 7,277,952 B2 | 10/2007 | Nishanov et al. | |
| 7,716,406 B1* | 5/2010 | Tyndall | G06F 13/387 340/2.1 |
| 8,719,473 B2 | 5/2014 | Das et al. | |
| 9,454,305 B1 | 9/2016 | Emralino et al. | |
| 9,641,614 B2 | 5/2017 | Kuznetsov et al. | |
| 2003/0065782 A1* | 4/2003 | Nishanov | G06F 9/5011 709/226 |
| 2015/0127917 A1 | 5/2015 | Mettu et al. | |
| 2015/0365274 A1* | 12/2015 | Anumalasetty | H04L 41/082 709/221 |
| 2018/0101324 A1* | 4/2018 | Sharma | G06F 3/0644 |

OTHER PUBLICATIONS

Ali, Saad, "Detailed Design for Volume Attach/Detach Controller," Issue 20262, github.com/kubernetes/kubernetes/issues/20262, Jan. 28, 2016, GitHub, Inc., 15 pages.
Author Unknown, "Persistent Storage," OpenShift Architecture, docs.openshift.com/enterprise/3.0/architecture/additional_concepts/storage.html, accessed Dec. 13, 2017, Red Hat, Inc., 8 pages.
Author Unknown, "What is SCSI Reservation & How it Works," www.govmlab.com/what-is-scsi-reservation/, Oct. 25, 2016, GOVMLab, 3 pages.
Read, Tim, "Oracle Solaris Cluster Essentials," (book excerpt), 1st Edition, Sep. 23, 2010, Prentice Hall, 1 page.

* cited by examiner

*Primary Examiner* — Larry T Mackall
(74) *Attorney, Agent, or Firm* — Withrow & Terranova, PLLC

(57) ABSTRACT

Dual-level storage device reservation is disclosed. A first request associated with a first application of a plurality of applications to reserve a first network-attached storage device for write access is accessed. A first storage device reservation key is stored on the first network-attached storage device to reserve the network-attached storage device. A first mapping entry that associates the first storage device reservation key with a first application identifier (ID) of the first application is generated. The first storage device reservation key is received from the first application, and a message is sent to the first application that contains information that identifies the first application as having write access to the first network-attached storage device based on the first mapping entry.

20 Claims, 5 Drawing Sheets

DUAL-LEVEL STORAGE DEVICE RESERVATION

TECHNICAL FIELD

The examples relate generally to the use of network-attached storage devices, and in particular to dual-level storage device reservation.

BACKGROUND

Certain network storage device protocols only allow one entity to write to the storage device at one time. A reservation mechanism is used to ensure that two applications are not writing to the storage device at the same time. In order to ensure that an application can write to the storage device, an application first attempts to reserve the storage device. If the reservation is successful, the application is able to write to the storage device. When the application is finished using the storage device, the application can release the reservation, and another application may reserve the storage device.

SUMMARY

The examples disclosed herein implement a dual-level reservation mechanism that eliminates a need for each application in a multiple application environment to be designed and written to handle the logic and complexity for ensuring that a network-attached storage device is properly reserved to ensure multiple applications are not writing to the network-attached storage device. Among other advantages, the examples implement a fast, efficient, and simple mechanism for ensuring that applications within the multiple application environment do not write to a network-attached storage device that has not been reserved for them.

In one example a method is provided. The method includes accessing, by a storage device controller executing on a host computing device comprising a processor device, a first request associated with a first application of a plurality of applications to reserve a first network-attached storage device for write access. The method further includes storing a first storage device reservation key on the first network-attached storage device to reserve the first network-attached storage device. The method further includes generating a first mapping entry that associates the first storage device reservation key with a first application identifier (ID) associated with the first application. The method further includes receiving the first storage device reservation key from the first application, and, based on the first mapping entry, sending a message to the first application that contains information that identifies the first application as having write access to the first network-attached storage device.

In another example a computing device is provided. The computing device includes a memory and a processor device coupled to the memory. The processor device is to access a first request associated with a first application of a plurality of applications to reserve a first network-attached storage device for write access. The processor device is further to store a first storage device reservation key on the first network-attached storage device to reserve the first network-attached storage device. The processor device is further to generate a first mapping entry that associates the first storage device reservation key with a first application ID associated with the first application. The processor device is further to receive the first storage device reservation key from the first application and, based on the first mapping entry, send a message to the first application that contains information that identifies the first application as having write access to the first network-attached storage device.

In another example a computer program product is provided. The computer program product is stored on a non-transitory computer-readable storage medium and includes instructions to cause a processor device to access a first request associated with a first application of a plurality of applications to reserve a first network-attached storage device for write access. The instructions further cause the processor device to store a first storage device reservation key on the first network-attached storage device to reserve the first network-attached storage device. The instructions further cause the processor device to generate a first mapping entry that associates the first storage device reservation key with a first application ID associated with the first application. The instructions further cause the processor device to receive the first storage device reservation key from the first application and, based on the first mapping entry, send a message to the first application that contains information that identifies the first application as having write access to the first network-attached storage device.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
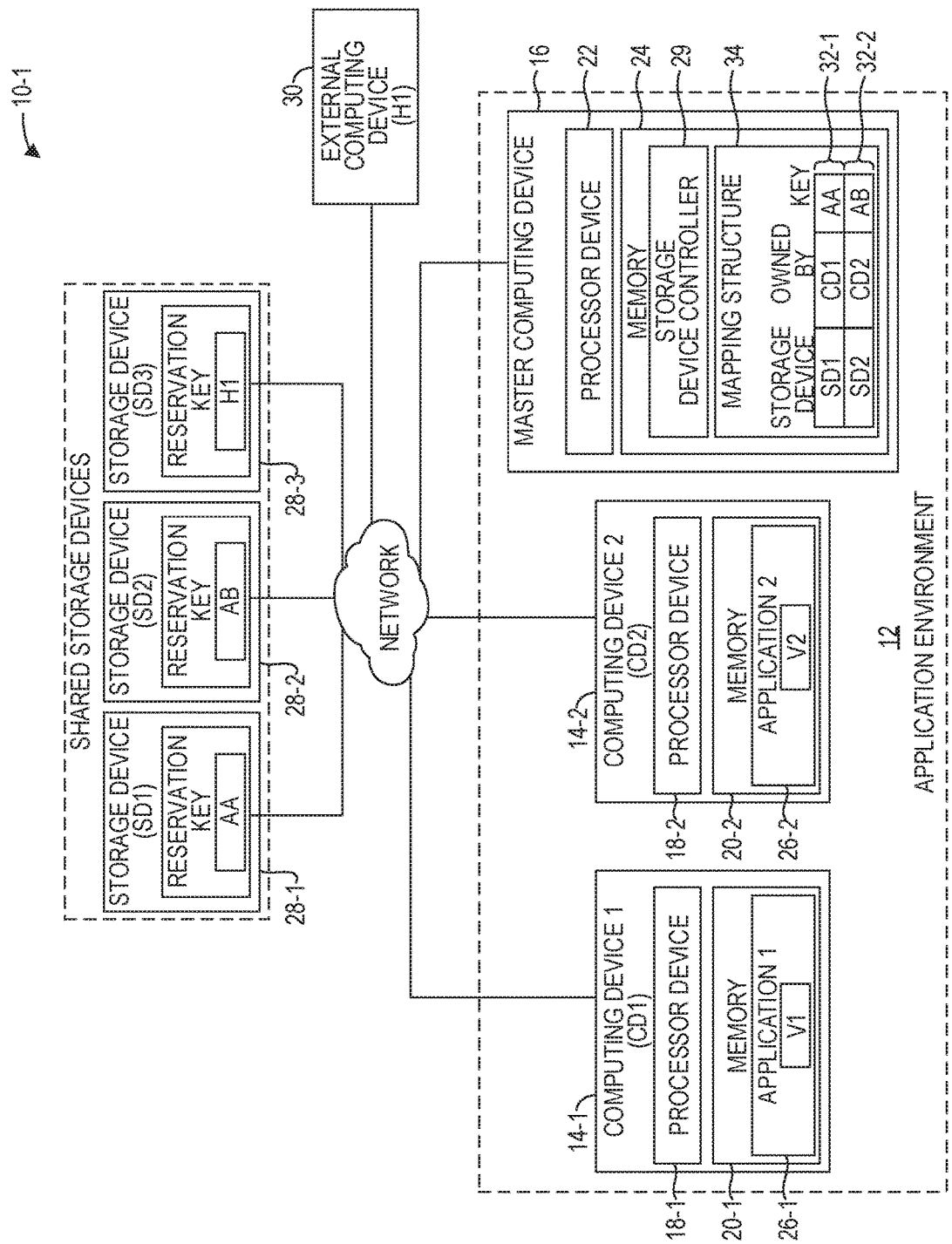
FIG. 1 is a block diagram of a first environment in which examples may be practiced.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first storage device" and "second storage device," and does not imply a priority, a type, an importance, or other attribute, unless otherwise stated herein. As used herein and in the claims, the articles "a" and "an" in reference to an element refers to "one or more" of the element unless otherwise explicitly specified.

Certain network storage device protocols only allow one entity to write to the storage device at one time. A reservation mechanism is used to ensure that two applications are not writing to the storage device at the same time. In order to ensure that an application can write to the storage device, the application first attempts to reserve the storage device. If the reservation is successful, the application is able to write to the storage device. When the application is done writing to the storage device, the application can release the reservation, and another application may reserve the storage device.

The reservation protocol to reserve a network-attached storage device can be relatively complex, may require that locks be obtained, may require logic to handle a variety of different situations, such as unavailability of a particular storage device, and may require a need to then search for another storage device that is available. In a multiple-application environment where applications may relatively frequently need a network-attached storage device, and then release the network-attached storage device, this processing can be time-consuming to implement. One such application environment is a container environment where persistent storage is provided to containers from a pool of network-attached storage devices. Containers may initiate, be attached to a network-attached storage device, and then terminate, on a frequent basis. It would be desirable to eliminate the need to separately reserve the network-attached storage device for each successive container that uses the network-attached storage device, but still be able to ensure that other applications outside the container environment do not use the network-attached storage device, and also ensure that two containers do not attempt to concurrently use the same network-attached storage device.

The examples disclosed herein implement a dual-level reservation mechanism that eliminates a need for each application in a multiple application environment to be designed and written to handle the logic and complexity for ensuring that a network-attached storage device is properly reserved to ensure that multiple applications are not writing to the network-attached storage device. The examples implement a fast and efficient dual-level mechanism for ensuring that applications do not write to a network-attached storage device that has not been reserved for them, and ensure that the network-attached storage device is not reserved by an application outside the multiple application environment.

In particular, upon receiving a request for a network-attached storage device from a first application, a storage device controller reserves the network-attached storage device with a storage device reservation key. The storage device controller then generates a mapping entry that associates the storage device reservation key with an application identifier (ID) of the first application. Prior to using the network-attached storage device, the first application accesses the network-attached storage device to read the reservation key of the network-attached storage device. The first application provides the reservation key to the storage device controller. The storage device controller accesses the mapping entry based on the reservation key, and sends the first application the application ID of the application currently associated with the network-attached storage device. The first application can then determine whether the first application currently has access to the network-attached storage device. After the first application is finished using the network-attached storage device, the storage device controller updates the mapping entry to indicate that the network-attached storage device is no longer associated with the first application and is available to be allocated to another application. However, the storage device controller maintains the reservation key on the network-attached storage device, and thus, no other application, such as an application that is external to the multiple application environment, can reserve the network-attached storage device.

The storage device controller may then access another request for the network-attached storage device from a second application. The storage device controller can simply update the mapping entry to associate the reservation key of the network-attached storage device with an application ID of the second application without a need for either the application or the storage device controller to again have to reserve the network-attached storage device. This process can be repeated as many times as necessary or desired, and eliminates the time-consuming and complex processing that would otherwise be necessary to repeatedly reserve the network-attached storage device, while ensuring that only one application has write access to the network-attached storage device at a time.

FIG. 1 is a block diagram of a first application environment 10-1 where examples can be practiced. A multiple application environment 12 includes a plurality of computing devices 14-1, 14-2 and a master computing device 16. The computing device 16 is referred to as a "master" computing device simply to denote that certain functions utilized by the computing devices 14-1, 14-2 (generally, computing devices 14) are centralized in the master computing device 16. The phrase multiple application environment refers to an application environment wherein some centralized node, or nodes, keep track of the various applications executing in the application environment. While only one master computing device 16 is illustrated, the application environment 12 may utilize any number of master computing devices 16. Moreover, while for purposes of illustration only two computing devices 14 are illustrated, the application environment 12 could have tens, hundreds or thousands of computing devices 14. In some examples, the application environment 12 is a cloud computing environment.

The computing device 14-1 includes a processor device 18-1 and a memory 20-1. The computing device 14-2 includes a processor device 18-2 and a memory 20-2. The master computing device 16 includes a processor device 22 and a memory 24. The computing device 14-1 executes an application 26-1, and the computing device 14-2 executes an application 26-2 (the applications 26-1 and 26-2 may be referred to herein generally as the applications 26). The applications 26 may be initiated and terminated upon demand, for example, by a centralized process (not illustrated) on the master computing device 16.

The applications 26 have access to one or more network-attached storage devices 28-1, 28-2 and 28-3 (generally, storage devices 28). The storage devices 28 each are configured to implement a storage device protocol that includes a reservation mechanism, such as, by way of non-limiting example, the small computer system interface (SCSI) storage device protocol. The storage devices 28 may also implement a storage networking protocol such as, by way of non-limiting example, internet small computer system interface (iSCSI) or Fibre Channel storage networking protocols. The storage devices 28 may also be accessible to one or more external computing devices 30 which are not part of the application environment 12, and which may have no interaction with or knowledge of the application environment 12.

The master computing device 16 includes a storage device controller 29 that is configured to reserve a storage device 28 for an application 26. The reservation may be in response, for example, from a request from an application 26, or from a determination that an application 26 will need access to a storage device 28. For example, in some examples, the initiation of an application 26 on a computing device 14 may be performed in conjunction with a script, a template, or other data file that may be analyzed to determine whether the application 26 requires write access to a storage device 28. Each application 26 may first be scheduled to be executed on a particular computing device 14, and the master computing device 16 may detect that an application 26 is to be initiated, examine the script, and determine that the application 26 will attempt to access a volume that is to be stored, or was previously stored, on a persistent storage device, such as one of the storage devices 28. In other examples, an application 26 may send a request to the storage device controller 29 to reserve a storage device 28.

As an example, the storage device controller 29 determines that the application 26-1 will use a volume V1 that is to be stored on the storage device 28-1. The storage device controller 29 may first access a mapping structure 34 to see if any mapping entry 32-1-32-2 is associated with the storage device 28-1. If so, then the storage device 28-1 need not be reserved by the storage device controller 29, because the existence of a mapping entry 32-1-32-2 associated with the storage device 28-1 means that the storage device 28-1 has already been reserved by the storage device controller 29. For purposes of illustration, assume that no mapping entry 32-1-32-2 is initially associated with the storage device 28-1.

The storage device controller 29 generates a first storage device reservation key ("AA") for the storage device 28-1. The first storage device reservation key may comprise any suitable ID as long as the first storage device reservation key is unique with respect to every other storage device reservation key used by the storage device controller 29. The first storage device reservation key may be generated randomly in some examples. The storage device controller 29 follows the appropriate reservation protocol associated with the storage device 28-1, such as the SCSI-3 persistent reservation protocol, and stores the first storage device reservation key as the reservation key on the storage device 28-1. The storage device controller 29 also generates the first mapping entry 32-1 that associates the first storage device reservation key ("AA") with an application ID ("CD1") associated with the first application 26-1 and stores the mapping entry 32-1 into the mapping structure 34. In this example, the application ID is an ID of the computing device 14-1 on which the first application 26-1 executes, but the application ID may be any identifier capable of being associated with the first application 26-1.

Prior to the first use of the volume V1, the application 26-1 determines that the volume V1 is bound to the storage device 28-1. The application 26-1 accesses the storage device 28-1 to obtain the storage device reservation key ("AA") from the storage device 28-1. The application 26-1 then sends the storage device reservation key ("AA") to the storage device controller 29. The storage device controller 29 receives the storage device reservation key ("AA"), and accesses the mapping structure 34 and, based on the storage device reservation key ("AA"), accesses the mapping entry 32-1. The storage device controller 29 extracts the application ID ("CD1") associated with the application 26 that currently has write access to the storage device 28-1 from the mapping entry 32-1, and sends the application ID ("CD1") to the application 26-1. The application 26-1 receives the application ID ("CD1"), and determines that the application ID ("CD1") is the application ID that is associated with the application 26-1, and thus determines that the application 26-1 currently has write access to the storage device 28-1. The application 26-1 begins to write to the storage device 28-1.

The storage device controller 29 undergoes a similar process with the application 26-2 and the storage device 28-2, and stores the mapping entry 32-2 that associates a second storage device reservation key "(AB)" with an application ID ("CD2") of the second application 26-2, and stores the mapping entry 32-2 into the mapping structure 34. Prior to a first use of the storage device 28-2, the application 26-2 accesses the storage device 28-2 to obtain the reservation key ("AB") from the storage device 28-2. The application 26-2 then sends the reservation key ("AB") to the storage device controller 29. The storage device controller 29 receives the reservation key ("AB"), and accesses the mapping structure 34 and, based on the reservation key ("AB"), accesses the mapping entry 32-2. The storage device controller 29 extracts the application ID ("CD2") of the application that currently has write access to the storage device 28-2 from the mapping entry 32-2, and sends the application ID ("CD2") of the application to the application 26-2. The application 26-2 receives the application ID ("CD2"), and determines that the application ID ("CD2") is the application ID that is associated with the application 26-2, and thus determines that the application 26-2 currently has write access to the storage device 28-2. The application 26-2 begins to write to the storage device 28-2.

Note that the external computing device 30 may also desire to write to the storage device 28-1. The external computing device 30 attempts to reserve the storage device 28-1, but determines that the storage device 28-1 is already reserved via the reservation key "AA", and thus does not attempt to write to the storage device 28-1.

In this manner, the applications 26 can quickly and efficiently confirm that they currently have write access to the respective storage devices 28, and thus ensure there are no sharing violations between applications 26 within the application environment 12, as well as with any external computing devices 30 that are unaware of the first application environment 10-1.

After the first application 26-1 is finished using the storage device 28-1, the storage device controller 29 determines that the first application 26-1 has released the storage device 28-1. This may be determined by the storage device controller 29 based on a message from the first application 26-1, or some event associated with the first application 26-1, such as the termination of the first application 26-1. The storage device controller 29 updates the mapping entry 32-1 to indicate that the first storage device reservation key is not associated with any application 26. Assume for purposes of illustration, that the storage device controller 29 accesses another request from another application for the storage device 28-1. The storage device controller 29 accesses the mapping structure 34 and determines that the mapping entry 32-1 is associated with the first storage device 28-1, and that the storage device reservation key ("AA") is not currently associated with any application 26. The storage device controller 29 updates the first mapping entry 32-1 with an application ID associated with the other application, thereby reserving the storage device 28-1 for the other application without having to process any reservation communications with the storage device 28-1.

Note that because the storage device controller 29 is a component of the master computing device 16, functionality implemented by the storage device controller 29 may be attributed to the master computing device 16 generally. Moreover, in examples where the storage device controller 29 comprises software instructions that program the processor device 22 to carry out functionality discussed herein, functionality implemented by the storage device controller 29 may be attributed herein to the processor device 22.

Similarly, because the application 26-1 is a component of the computing device 14-1, functionality implemented by the application 26-1 may be attributed to the computing device 14-1 generally. Moreover, in examples where the application 26-1 comprises software instructions that program the processor device 18-1 to carry out functionality discussed herein, functionality implemented by the application 26-1 may be attributed herein to the processor device 18-1.

Figure 2:
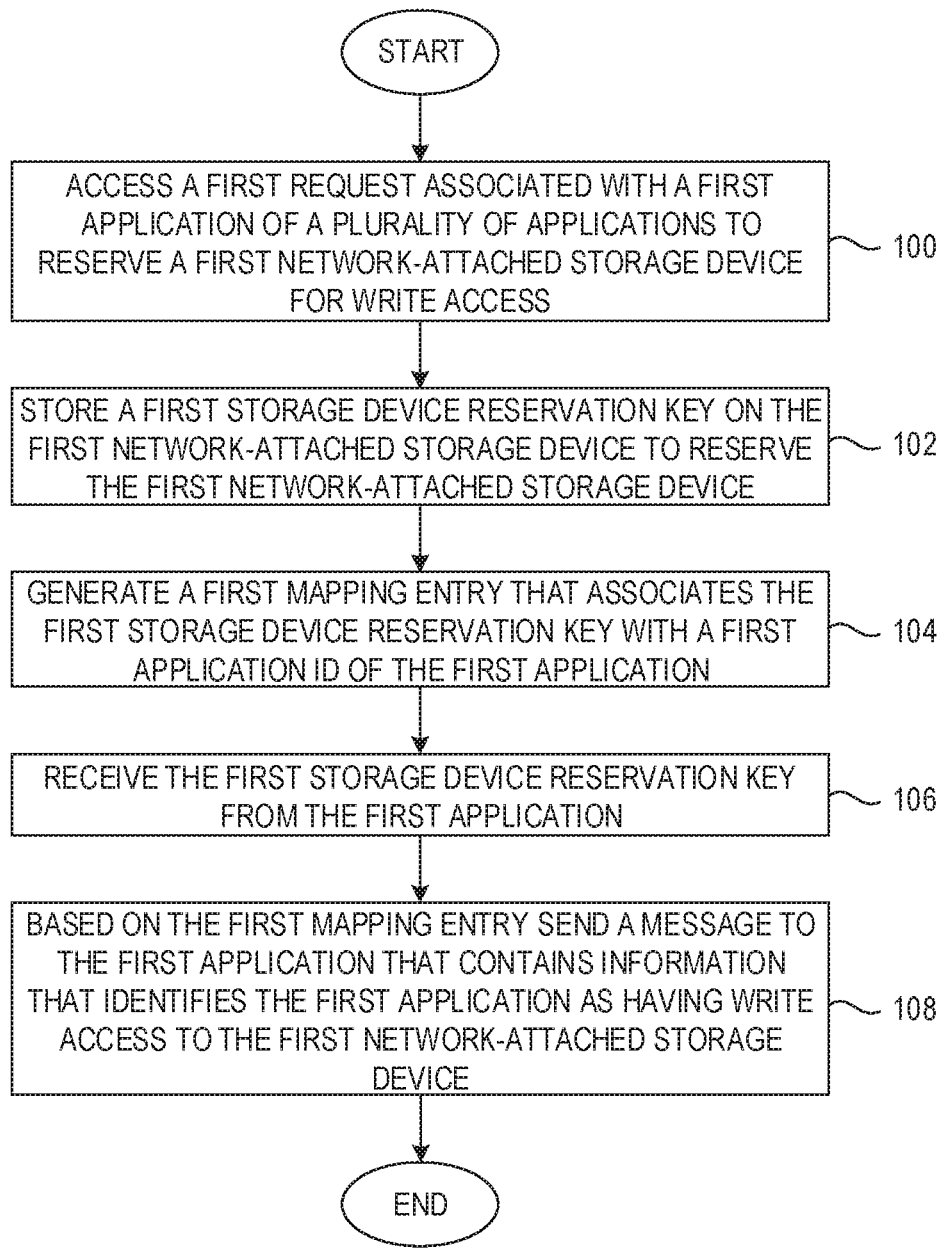
FIG. 2 is a flowchart of a method for implementing dual-level storage device reservation according to one example.

FIG. 2 is a flowchart of a method for implementing dual-level storage device reservation according to one example. FIG. 2 will be discussed in conjunction with FIG. 1. The storage device controller 29 accesses a first request associated with the application 26-1 to reserve the network-attached storage device 28-1 for write access (FIG. 2, block 100). The network-attached storage device 28-1 is configured to implement a reservation protocol that allows the network-attached storage device 28-1 to be reserved for write-access by an application. The storage device controller 29 stores a first storage device reservation key ("AA") as the reservation key on the network-attached storage device 28-1 (FIG. 2, block 102). The storage device controller 29 generates a first mapping entry 32-1 that associates the first storage device reservation key ("AA") with a first application ID ("CD1") of the application 26-1 (FIG. 2, block 104). The storage device controller 29 receives the first storage device reservation key ("AA") from the application 26-1, and based on the first mapping entry 32-1, sends a message to the application 26-1 that contains information that identifies the application 26-1 as having write access to the storage device 28-1 (FIG. 2, blocks 106-108).

Figure 3:
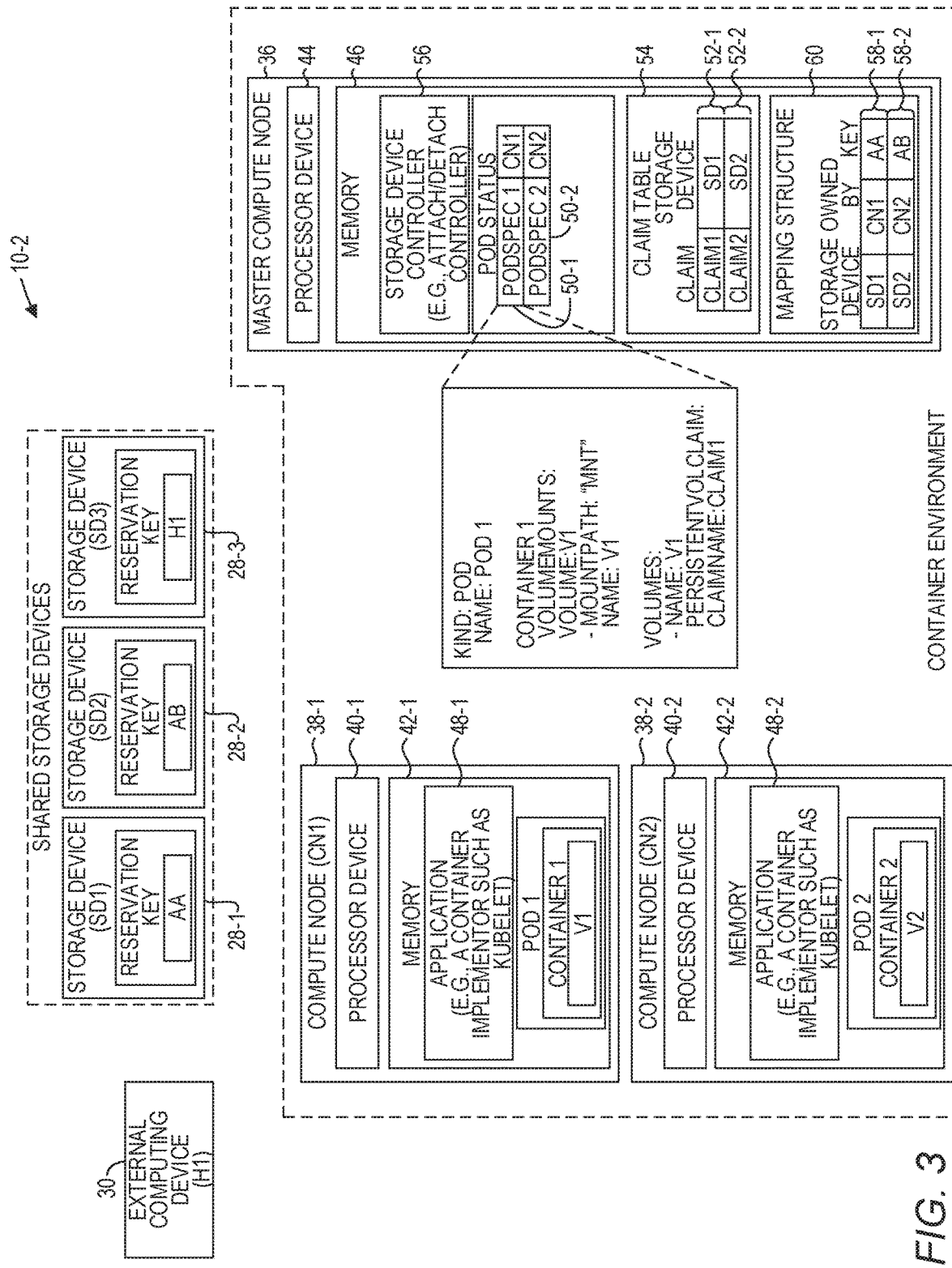
FIG. 3 is a block diagram of a second environment in which additional examples may be practiced.

FIG. 3 is a block diagram of a multiple application environment 10-2 in which additional examples may be practiced. The environment 10-2 is a container environment, in which a plurality of containers, such as, by way of non-limiting example, Docker containers, that utilize persistent storage volumes may be dynamically initiated and terminated, on demand. Aspects of the environment 10-2 will be discussed in the context of the Kubernetes container orchestrator, and the use of pods, but the examples are not limited to any particular container orchestrator or containerization technologies.

In this example, a master compute node 36 is responsible for scheduling pods, as will be described below in greater detail, among one or more compute nodes 38-1, 38-2 (generally, compute nodes 38). The compute node 38-1 includes a processor device 40-1 and a memory 42-1. The compute node 38-2 includes a processor device 40-2 and a memory 42-2. The master compute node 36 includes a processor device 44 and a memory 46. The compute node 38-1 includes an application 48-1 that is configured to generate pods, and cause the initiation of containers, such as via a container engine such as Docker, or the like. Similarly, the compute node 38-2 includes an application 48-2 that is configured to generate pods, and cause the initiation of containers, such as via a container engine.

A pod is a logical entity that isolates one or more containers from containers in another pod. A pod is defined via a pod specification which includes information such as an identification of the containers in the pod, the volumes used by the containers in the pod, and the like. The master compute node 36 receives pod specifications 50-1-50-2 (generally, pod specifications 50), and schedules the pods defined by the pod specifications 50-1-50-2 for execution on a compute node 38. In this example, the pod defined by the pod specification 50-1 has been scheduled to execute on the compute node 38-1, and the pod defined by the pod specification 50-2 has been scheduled to execute on the compute node 38-2.

A volume used by a container in a pod is bound to a particular storage device 28 via an object referred to herein as a claim. A claim defines attributes of a persistent storage device that will be used by one or more containers in a pod. The master compute node 36 matches a claim against a storage device 28 that is available and that has attributes that comply with the claim, such as available storage size, or the like. When a claim is matched to a storage device 28, a claim entry 52 is generated and stored in a claim table 54 that identifies the claim and the storage device 28 to which the claim is bound. For example, a claim entry 52-1 indicates that a claim CLAIM1 has been bound to the storage device 28-1 ("SD1"), and a CLAIM2 has been bound to the storage device 28-2 ("SD2").

A storage device controller 56 examines the pod specifications 50 to determine whether a pod will utilize a storage device 28. For example, the storage device controller 56 examines the pod specification 50-1 and determines that the pod POD1 defined in the pod specification 50-1 includes a volume V1 that is associated with the claim CLAIM1. The storage device controller 56 accesses the claim table 54 and, based on the claim entry 52-2, determines that the claim CLAIM1 is bound to the storage device 28-1 ("SD1").

The storage device controller 56 may first access a mapping structure 60 to determine if any mapping entries 58 correspond to the storage device 28-1. If so, then the storage device controller 56 had already reserved the storage device 28-1. For purposes of illustration, assume that initially no mapping entries 58 correspond to the storage device 28-1, which means that the storage device controller 56 had not previously reserved the storage device 28-1. The storage device controller 56 generates a first storage device reservation key ("AA"). The storage device controller 56 follows the appropriate reservation protocol associated with the storage device 28-1, such as the SCSI-3 persistent reservation protocol, and stores the first storage device reservation key ("AA") as the reservation key on the storage device 28-1. The storage device controller 56 generates a first mapping entry 58-1 that associates the first storage device reservation key ("AA") with an application ID ("CN1") associated with the application 48-1 and stores the mapping entry 58-1 in the mapping structure 60.

The pod specification 50-1 is provided to the application 48-1 for initiation of the pod POD1 on the compute node 38-1. The application 48-1 analyzes the pod specification 50-1 and identifies the claim CLAIM1. The application 48-1 accesses the claim table 54 and determines that the claim CLAIM1 is bound to the storage device 28-1.

The application 48-1 accesses the storage device 28-1 to obtain the reservation key ("AA") from the storage device 28-1. The application 48-1 then sends the reservation key ("AA") to the storage device controller 56. The storage device controller 56 receives the reservation key ("AA"), and accesses the mapping structure 60 and, based on the reservation key ("AA"), accesses the mapping entry 58-1. The storage device controller 56 extracts the application ID ("CN1") associated with the application that currently has write access to the storage device 28-1 from the mapping entry 58-1, and sends the application ID ("CN1") of the application to the application 48-1. The application 48-1 receives the application ID ("CN1"), and determines that the application ID ("CN1") is the application ID that is associated with the application 48-1, and thus determines that the application 48-1 currently has write access to the storage device 28-1. The application 26-1 then mounts the volume V1 of the pod POD1 to allow the containers defined in the pod specification 50-1 to write to the storage device 28-1.

Assume that the application 48-2 is provided a different pod specification that includes the claim CLAIM1. The application 48-2 accesses the storage device 28-1 to obtain the reservation key ("AA") from the storage device 28-1. The application 48-2 then sends the reservation key ("AA") to the storage device controller 56. The storage device controller 56 receives the reservation key ("AA"), and accesses the mapping structure 60 and, based on the reservation key ("AA"), accesses the mapping entry 58-1. The storage device controller 56 extracts the application ID ("CN1") of the application that currently has write access to the storage device 28-1 from the mapping entry 58-1, and sends the application ID ("CN1") of the application to the application 48-2. The application 48-2 receives the application ID ("CN1"), and determines that the application ID ("CN1") is not the ID that is associated with the application 48-2, and thus determines that the application 48-2 does not currently have write access to the storage device 28-1. The application 48-2 does not mount the volume of the pod and thereby prevents any container in the pod from accessing the storage device 28-1.

In another example, assume that the pod defined by the pod specification 50-2 identifies a claim CLAIM2. The storage device controller 56 examines the pod specification 50-2 and determines that the pod defined in the pod specification 50-2 includes a volume that is associated with the claim CLAIM2. The storage device controller 56 accesses the claim table 54 and, based on the claim entry 52-2, determines that the claim CLAIM2 is bound to the storage device 28-2 ("SD2").

The storage device controller 56 generates a second storage device reservation key ("AB"). The storage device controller 56 follows the appropriate reservation protocol associated with the storage device 28-2, such as the SCSI-3 persistent reservation protocol, and stores the second storage device reservation key ("AB") as the reservation key on the storage device 28-2. The storage device controller 56 generates a second mapping entry 58-2 that associates the second storage device reservation key ("AB") with an application ID ("CN2") associated with the application 48-2 and stores the mapping entry 58-2 in the mapping structure 60.

The pod specification 50-2 is provided to the application 48-2 for initiation of the pod on the compute node 38-2. The application 48-2 analyzes the pod specification 50-2 and identifies the claim CLAIM2. The application 48-2 accesses the claim table 54 and determines that the claim CLAIM2 is bound to the storage device 28-2.

The application 48-2 accesses the storage device 28-2 to obtain the reservation key ("AB") from the storage device 28-2. The application 48-2 then sends the reservation key ("AB") to the storage device controller 56. The storage device controller 56 receives the reservation key ("AB"), and accesses the mapping structure 60 and, based on the reservation key ("AB"), accesses the mapping entry 58-2. The storage device controller 56 extracts the application ID ("CN2") of the application that currently has write access to the storage device 28-2 from the mapping entry 58-2, and sends the application ID ("CN2") of the application to the application 48-2. The application 48-2 receives the application ID ("CN2"), and determines that the application ID ("CN2") is the application ID that is associated with the application 48-2, and thus determines that the application 48-2 currently has write access to the storage device 28-2. The application 48-2 then mounts the volume of the pod to allow the containers defined in the pod specification 50-2 to write to the storage device 28-2.

After the application 48-1 is done with the storage device 28-1, the storage device controller 56 updates the mapping entry 58-1 to indicate that the storage device 28-1 is not associated with any application 48. Upon accessing another request by an application 48 for the storage device 28-1, the storage device controller 56 may allocate the storage device 28-1 to the application 48 by updating the mapping entry 58-1 with the application ID of the application 48 without having to engage in the reservation process with the storage device 28-1.

While in this example the storage device controller 56 is illustrated as providing storage device management for applications 48 that execute on the compute nodes 38, and which execute pods, in other examples, each application 48 may operate as the storage device controller for the containers that execute on the respective compute node 38. In such example, each application 48 would have a separate mapping structure that contains mapping entries that identify the storage devices 28 reserved by the application 48, and the containers that are currently associated with the storage device 28. When a container is finished with the storage device 28, the application 48 may allocate the storage device 28 to another container that requires persistent storage.

Figure 4:
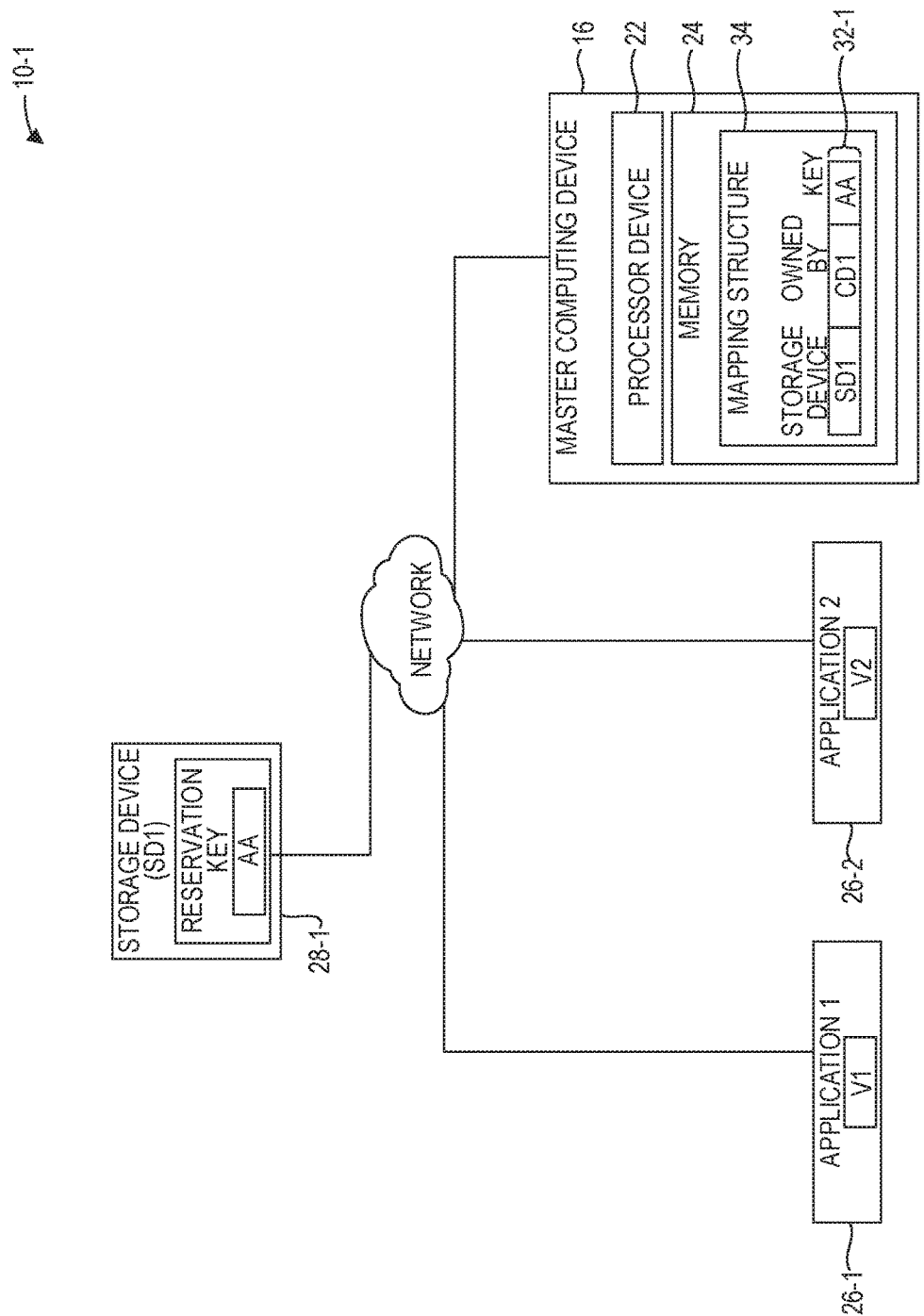
FIG. 4 is a simplified block diagram of FIG. 1 according to one example.

FIG. 4 is a simplified block diagram of FIG. 1 according to one example. In this example, the computing device 16 includes the memory 24 and the processor device 22 which is coupled to the memory 24. The processor device 22 is to access a first request associated with the first application 26-1 of the plurality of applications 26-1, 26-2 to reserve the first network-attached storage device 28-1 for write access. The processor device 22 is further to store a first storage device reservation key ("AA") on the network-attached storage device 28-1 to reserve the network-attached storage device 28-1. The processor device 22 is further to generate the first mapping entry 32-1 that associates the first storage device reservation key ("AA") with the first application ID ("CD1") of the first application 26-1. The processor device 22 is further to receive the first storage device reservation key ("AA") from the first application 26-1, and send a message to the first application 26-1 that contains information that identifies the first application 26-1 as having write access to the first storage device 28-1 based on the first mapping entry 32-1.

Figure 5:
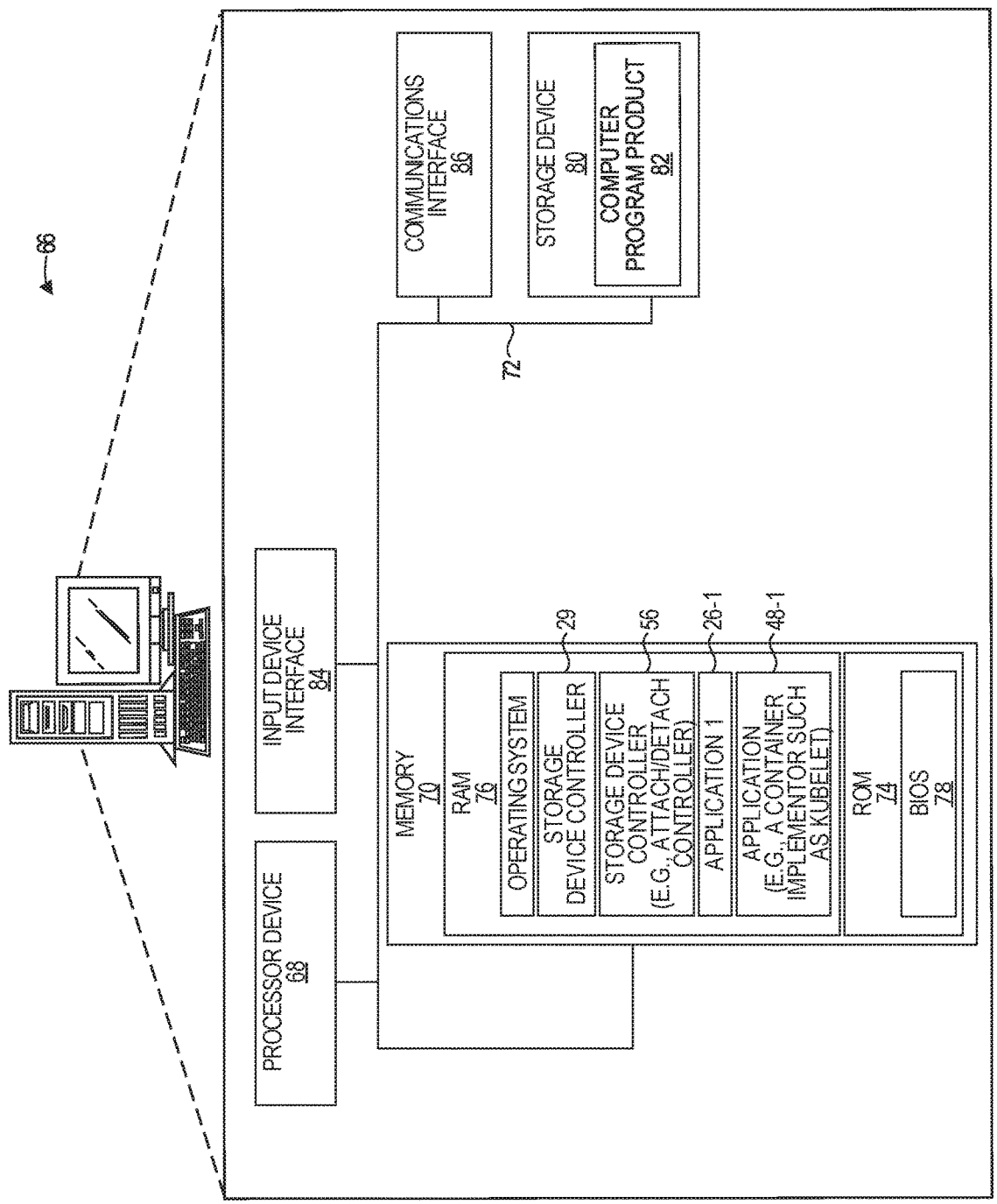
FIG. 5 is a block diagram of a computing device suitable for implementing examples herein.

FIG. 5 is a block diagram of a computing device 66 that is suitable for implementing any of the computing devices 14, 16 or compute nodes 36, 38. The computing device 66 may comprise any computing or electronic device capable of including firmware, hardware, and/or executing software instructions to implement the functionality described herein, such as a computer server, a desktop computing device, a laptop computing device, or the like. The computing device 66 includes a processor device 68, a system memory 70, and a system bus 72. The system bus 72 provides an interface for system components including, but not limited to, the system memory 70 and the processor device 68. The processor device 68 can be any commercially available or proprietary processor.

The system bus 72 may be any of several types of bus structures that may further interconnect to a memory bus (with or without a memory controller), a peripheral bus, and/or a local bus using any of a variety of commercially available bus architectures. The system memory 70 may include non-volatile memory 74 (e.g., read-only memory (ROM), erasable programmable read-only memory (EPROM), electrically erasable programmable read-only memory (EEPROM), etc.), and volatile memory 76 (e.g., random-access memory (RAM)). A basic input/output system (BIOS) 78 may be stored in the non-volatile memory 74 and can include the basic routines that help to transfer information between elements within the computing device 66. The volatile memory 76 may also include a high-speed RAM, such as static RAM, for caching data.

The computing device 66 may further include or be coupled to a non-transitory computer-readable storage medium such as a storage device 80, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 80 and other drives associated with computer-readable media and computer-usable media may provide non-volatile storage of data, data structures, computer-executable instructions, and the like.

A number of modules can be stored in the storage device 80 and in the volatile memory 76, including an operating system and one or more program modules, such as the storage device controllers 29, 56, or the applications 26-1, 48-1, which may implement the functionality described herein in whole or in part.

All or a portion of the examples may be implemented as a computer program product 82 stored on a transitory or non-transitory computer-usable or computer-readable storage medium, such as the storage device 80, which includes complex programming instructions, such as complex computer-readable program code, to cause the processor device 68 to carry out the steps described herein. Thus, the computer-readable program code can comprise software instructions for implementing the functionality of the examples described herein when executed on the processor device 68.

An operator may also be able to enter one or more configuration commands through a keyboard (not illustrated), a pointing device such as a mouse (not illustrated), or a touch-sensitive surface such as a display device. Such input devices may be connected to the processor device 68 through an input device interface 84 that is coupled to the system bus 72 but can be connected by other interfaces such as a parallel port, an Institute of Electrical and Electronic Engineers (IEEE) 1394 serial port, a Universal Serial Bus (USB) port, an IR interface, and the like.

The computing device 66 may also include a communications interface 86 suitable for communicating with a network as appropriate or desired.

Individuals will recognize improvements and modifications to the preferred examples of the disclosure. All such improvements and modifications are considered within the scope of the concepts disclosed herein and the claims that follow.

What is claimed is:

1. A method comprising:
    determining, by a storage device controller executing on a host computing device comprising a processor device, that a first network-attached storage device is to be reserved for a first application of a plurality of applications for write access to the first network-attached storage device by the first application;
    in response to determining that the first network-attached storage device is to be reserved, storing, by the storage device controller, a first storage device reservation key on the first network-attached storage device to reserve the first network-attached storage device;
    subsequent to storing the first storage device reservation key, generating, by the storage device controller, a first mapping entry that associates the first storage device reservation key with a first application identifier (ID) associated with the first application;
    receiving, by the storage device controller, the first storage device reservation key from the first application prior to access of the first network-attached storage device by the first application; and
    in response to receiving the first storage device reservation key from the first application and based on the first mapping entry, sending, by the storage device controller, a message to the first application that contains information that identifies the first application as having write access to the first network-attached storage device.

2. The method of claim 1 further comprising:
    determining that the first application has released the first network-attached storage device; and
    updating the first mapping entry to indicate that the first storage device reservation key is not associated with any application.

3. The method of claim 2 further comprising:
    accessing, by the storage device controller, a second request associated with a second application of the plurality of applications to reserve the first network-attached storage device for write access;
    accessing the first mapping entry to determine that the first network-attached storage device is not associated with any application; and
    updating the first mapping entry with a second application ID associated with the second application.

4. The method of claim 1 wherein receiving the first storage device reservation key from the first application comprises receiving the first storage device reservation key from the first application, the first application executing on a first computing device that is different from the host computing device.

5. The method of claim 1 wherein storing the first storage device reservation key on the first network-attached storage device comprises:
    generating a small computer system interface (SCSI) persistent reservation with the first storage device reservation key; and
    transmitting the SCSI persistent reservation to the first network-attached storage device in accordance with a storage networking protocol.

6. The method of claim 5 wherein the storage networking protocol comprises one of an internet small computer system interface (iSCSI) storage networking protocol and a Fibre Channel storage networking protocol.

7. The method of claim 1 wherein sending the message to the first application that contains information that identifies the first application as having write access to the first network-attached storage device based on the first mapping entry further comprises:
    accessing a mapping structure that comprises the first mapping entry;

selecting the first mapping entry in the mapping structure based on the first storage device reservation key received from the first application;
extracting the first application ID from the first mapping entry; and
sending the first application ID to the first application.

8. The method of claim 1 further comprising:
receiving, by the storage device controller, the first storage device reservation key from a second application; and
sending a message to the second application that contains information that indicates the second application does not have write access to the first network-attached storage device.

9. The method of claim 8 further comprising:
accessing a mapping structure that comprises the first mapping entry;
selecting the first mapping entry in the mapping structure based on the first storage device reservation key received from the second application;
extracting the first application ID from the first mapping entry; and
sending the first application ID to the second application.

10. The method of claim 1 further comprising:
receiving, by the storage device controller, a second request associated with a second application of the plurality of applications to reserve a second network-attached storage device for write access;
storing a second storage device reservation key on the second network-attached storage device to reserve the second network-attached storage device;
generating a second mapping entry that associates the second storage device reservation key with a second application ID associated with the second application;
receiving the second storage device reservation key from the second application; and
based on the second mapping entry, sending a message to the second application that contains information that identifies the second application as having write access to the second network-attached storage device.

11. The method of claim 1 wherein the first application comprises a container controller, and further comprising:
determining, by the container controller executing on a first compute node, that a volume of a first container is bound to the first network-attached storage device;
accessing the first network-attached storage device to obtain a storage device reservation key from the first network-attached storage device;
sending the storage device reservation key to the storage device controller;
receiving the message that contains the information that identifies the first application as having write access to the first network-attached storage device; and
in response to the message, mounting the volume to allow the first container to utilize the volume.

12. A computing device, comprising:
a memory; and
a processor device coupled to the memory to:
determine that a first network-attached storage device is to be reserved for a first application of a plurality of applications for write access to the first network-attached storage device by the first application;
in response to determining that the first network-attached storage device is to be reserved, store a first storage device reservation key on the first network-attached storage device to reserve the first network-attached storage device;

subsequent to storing the first storage device reservation key, generate, by the storage device controller, a first mapping entry that associates the first storage device reservation key with a first application identifier (ID) associated with the first application;
receive the first storage device reservation key from the first application prior to access of the first network-attached storage device by the first application; and
send a message to the first application that contains information that identifies the first application as having write access to the first network-attached storage device in response to receiving the first storage device reservation key from the first application and based on the first mapping entry.

13. The computing device of claim 12 wherein the processor device is further to:
determine that the first application has released the first network-attached storage device; and
update the first mapping entry to indicate that the first storage device reservation key is not associated with any application.

14. The computing device of claim 13 wherein the processor device is further to access a second request associated with a second application of the plurality of applications to reserve the first network-attached storage device for write access;
access the first mapping entry to determine that the first network-attached storage device is not associated with any application; and
update the first mapping entry with a second application ID associated with the second application.

15. The computing device of claim 12 wherein to receive the first storage device reservation key from the first application, the processor device is further to receive the first storage device reservation key from the first application, the first application executing on a first computing device that is different from the computing device.

16. The computing device of claim 12 wherein to send the message to the first application that contains information that identifies the first application as having write access to the first network-attached storage device, the processor device is further to:
access a mapping structure that comprises the first mapping entry;
select the first mapping entry in the mapping structure based on the first storage device reservation key received from the first application;
extract the first application ID from the first mapping entry; and
send the first application ID to the first application.

17. The computing device of claim 12 wherein the processor device is further to:
receive the first storage device reservation key from a second application; and
send a message to the second application that contains information that indicates the second application does not have write access to the first network-attached storage device.

18. A non-transitory computer-readable storage medium that includes executable instructions to cause a processor device to:
determine that a first network-attached storage device is to be reserved for a first application of a plurality of applications for write access to the first network-attached storage device by the first application;
in response to determining that the first network-attached storage device is to be reserved, store a first storage device reservation key on the first network-attached storage device to reserve the first network-attached storage device;

subsequent to storing the first storage device reservation key, generate, by the storage device controller, a first mapping entry that associates the first storage device reservation key with a first application identifier (ID) associated with the first application;

receive the first storage device reservation key from the first application prior to access of the first network-attached storage device by the first application; and send a message to the first application that contains information that identifies the first application as having write access to the first network-attached storage device in response to receiving the first storage device reservation key from the first application and based on the first mapping entry.

19. The non-transitory computer-readable storage medium of claim 18 wherein to receive the first storage device reservation key from the first application, the instructions further cause the processor device to receive the first storage device reservation key from the first application, the first application executing on a first computing device that is different from a host computing device that comprises the processor device.

20. The non-transitory computer-readable storage medium of claim 18 wherein to send the message to the first application that contains information that identifies the first application as having write access to the first network-attached storage device, the instructions further cause the processor device to:

access a mapping structure that comprises the first mapping entry;

select the first mapping entry in the mapping structure based on the first storage device reservation key received from the first application;

extract the first application ID from the first mapping entry; and send the first application ID to the first application.

* * * * *